United States Patent
Parison, Jr. et al.

(10) Patent No.: US 8,112,198 B2
(45) Date of Patent: Feb. 7, 2012

(54) LOADING AND UNLOADING STABILIZATION IN AN ACTIVE SUSPENSION SYSTEM

(75) Inventors: James A. Parison, Jr., New Ipswich, NH (US); Antonio Sangermano, II, Rindge, NH (US); Yongkai Xu, Waltham, MA (US)

(73) Assignee: Bose Corporation, Framingham, MA (US)

( * ) Notice: Subject to any disclaimer, the term of this patent is extended or adjusted under 35 U.S.C. 154(b) by 982 days.

(21) Appl. No.: 12/059,336

(22) Filed: Mar. 31, 2008

(65) Prior Publication Data
US 2009/0248246 A1 Oct. 1, 2009

(51) Int. Cl.
G06F 17/00 (2006.01)
(52) U.S. Cl. .......................................... 701/37; 701/49
(58) Field of Classification Search .................. 701/37, 701/49; 180/273
See application file for complete search history.

(56) References Cited

U.S. PATENT DOCUMENTS

| | | | |
|---|---|---|---|
| 4,589,620 A | 5/1986 | Sakamoto | |
| 4,664,218 A * | 5/1987 | Graham et al. | 180/272 |
| 5,582,385 A * | 12/1996 | Boyle et al. | 248/550 |
| 5,908,456 A * | 6/1999 | Wahlers | 701/37 |
| 5,975,508 A * | 11/1999 | Beard | 267/136 |
| 6,311,110 B1 * | 10/2001 | Ivers et al. | 701/37 |
| 7,878,312 B2 * | 2/2011 | Hiemenz et al. | 188/377 |
| 7,921,973 B2 * | 4/2011 | Wereley et al. | 188/266 |
| 2001/0037169 A1 * | 11/2001 | Clair | 701/37 |
| 2005/0098399 A1 * | 5/2005 | Bremner | 188/266 |
| 2006/0095180 A1 | 5/2006 | Ummethala et al. | |
| 2006/0200287 A1 | 9/2006 | Parison et al. | |
| 2009/0218867 A1 * | 9/2009 | Clark | 297/344.12 |
| 2010/0332079 A1 * | 12/2010 | Wang et al. | 701/37 |

FOREIGN PATENT DOCUMENTS

| | | |
|---|---|---|
| EP | 1652724 B1 | 5/2006 |
| EP | 1782996 A2 | 5/2007 |
| GB | 2138102 | 10/1984 |

OTHER PUBLICATIONS

International Preliminary Report on Patentability dated Oct. 14, 2010 for PCT/US2009/033654.
International Search Report and Written Opinion dated May 11, 2009 for PCT/US2009/033654.

* cited by examiner

*Primary Examiner* — Ruth Ilan (57) ABSTRACT

An active suspension system includes a relative slow-responding force bias eliminator (such as a pneumatic actuator) and a relatively fast-responding actuator (such as an electromagnetic actuator) that together support a plant (such as a truck seat or vehicle cabin). The system also includes a load-unload detector (which may be a physical or virtual detector) to detect a loading or unloading of the plant. When such a loading or unloading is detected, the system causes the force bias eliminator to respond quickly (e.g., as quick as possible) while controlling the fast-responding actuator so as to preserve the available energy for operating the actuator (e.g., so as to keep the fast-responding actuator from consuming all of its available energy) prior to when the force bias eliminator can respond.

21 Claims, 5 Drawing Sheets

LOADING AND UNLOADING STABILIZATION IN AN ACTIVE SUSPENSION SYSTEM

FIELD

This disclosure relates to active suspension systems.

BACKGROUND

As described in U.S. patent application Ser. No. 10/978,105 titled "Active Suspending" and filed Oct. 29, 2004, active suspension systems may be deployed in vehicles, such as cars, trucks, boats, ships, and aircraft, to keep a plant (such as a seat, platform and/or cabin) in approximately the same vertical position relative to a horizontal axis of the vehicle.

SUMMARY

In one aspect, an active suspension system includes a relatively slow-responding force bias eliminator (such as a pneumatic actuator) and a relatively fast-responding actuator (such as an electromagnetic actuator) that together suspend a plant relative to a platform. The system may include a load-unload detector (which may be a physical or virtual detector) to detect a loading or unloading of the plant. When such a loading or unloading is detected, the system may be configured to cause the force bias eliminator to respond quickly (e.g., as quickly as possible) while controlling the fast-responding actuator so as to preserve the available energy for operating the actuator (e.g., so as to keep the fast-responding actuator from consuming all of its available energy) prior to when the force bias eliminator can respond.

In another aspect, an active suspension system includes a force bias eliminator and an actuator configured to be operably coupled to an energy source. The system also includes a plant connected to and suspended relative to a vehicle by the force bias eliminator and the actuator, such that the actuator and force bias eliminator jointly suspend the plant relative to the vehicle along a substantially vertical axis. The system also includes a load-unload detector that detects a loading or unloading of the plant and a control system operably coupled to the load-unload detector, the force bias eliminator and the actuator. The control system is configured to respond to a loading or unloading of the plant detected by the load-unload detector by (i) causing the force bias eliminator to respond to counteract forces acting on the plant as a result of the loading or unloading; and (ii) controlling the actuator to preserve energy available from the energy source while the force bias eliminator responds to counteract the forces.

Implementations may include one or more of the following features. The actuator may be an electromagnetic actuator and the force bias eliminator may be a variable capacity pneumatic cylinder that is controlled by controlling one or more valves for adding or reducing the amount of compressed air in the cylinder. The load-unload detector may be a physical detector that directly detects a load/unload event (such as a pressure switch) or a virtual detector that indirectly detects a load/unload event. The plant may be a seat (such as a truck seat), a cabin or other component of the vehicle.

The controller may be configured to reduce the rate of discharge of the energy supplied to the actuator over time from when the loading or unloading of the plant is detected. The controller may be configured to reduce the rate of discharge of energy such that it prevents the energy available in the store from being fully discharged before the force bias eliminator responds to counteract the forces acting on the plant as a result of the loading or unloading.

In another aspect, a method for controlling an active suspension system that includes a plant connected to and suspended relative to a vehicle by a force bias eliminator and actuator, the method includes receiving a signal from an load-unload detector indicating that a loading or unloading of a plant has occurred and, in response, causing the force bias eliminator to response to counteract forces acting on the plant as a result of the loading or unloading and controlling the actuator to preserve energy available from an energy source while the force bias eliminator responds to counteract the forces.

Implementations may include one or more of the following features. Controlling the actuator to preserve energy may include reducing a rate of discharge of the energy over time from when the loading or unloading of the plant is detected. The method may also include estimating a position of the plant, comparing the estimated position of the plant with an actual position of the plant to determine a prediction error, and determining whether loading or unloading of the plant has occurred based on at least the magnitude of the prediction error.

Other features and advantages will be apparent from the description and the claims.

DETAILED DESCRIPTION

Figure 1:
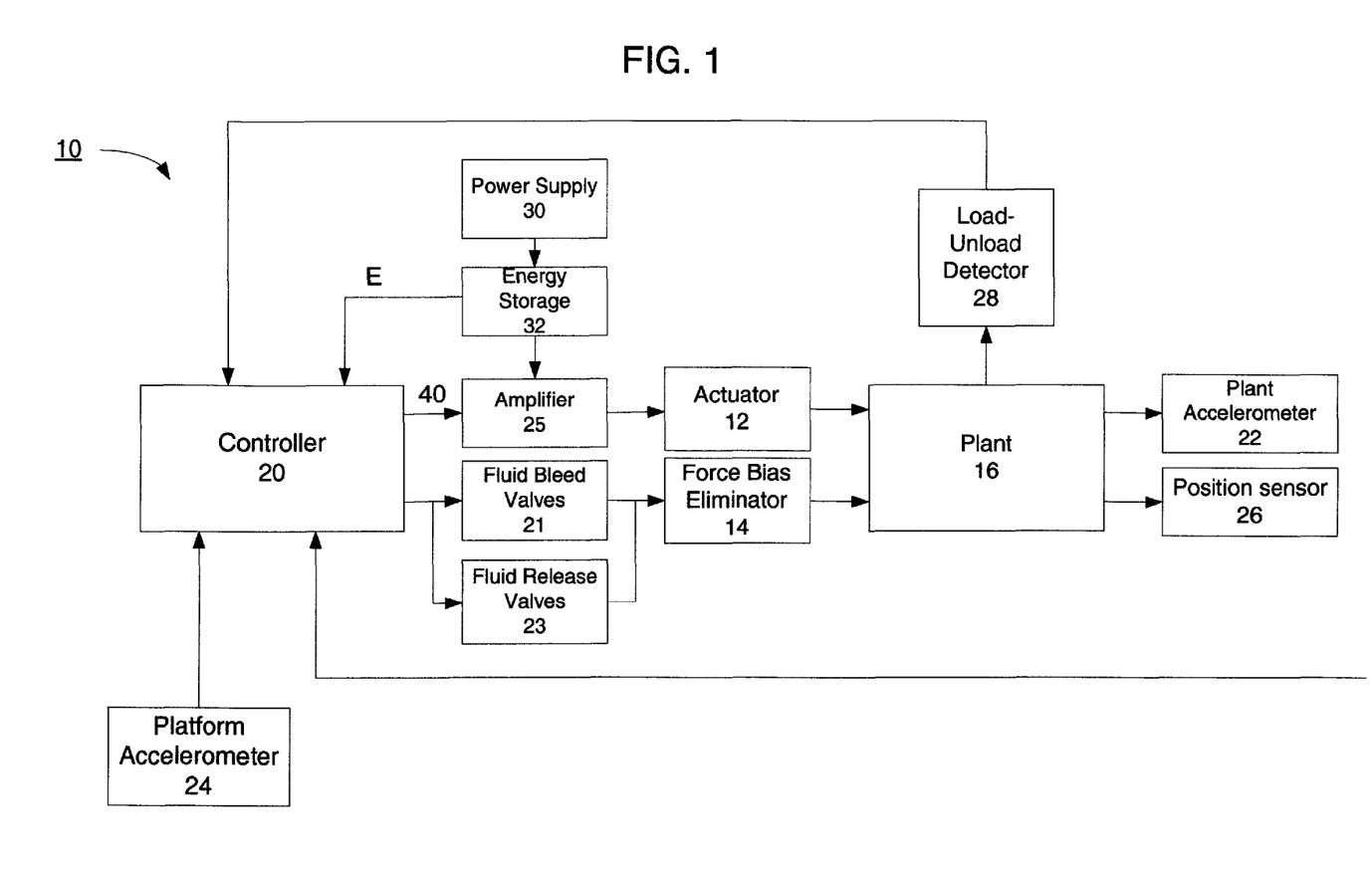
FIG. 1 is a block diagram of an active suspension system.

As shown in FIG. 1, an active suspension system 10 includes an electromagnetic actuator 12 and a force bias eliminator 14 that cooperatively suspend a plant 16 above a platform (not shown). The system 10 also includes a controller 20 that receives information from various sensors (including accelerometers 22 and 24, position sensor 26 and load-unload detector 28) and controls operation of the actuator 12 and force bias eliminator 14 to keep plant 16 in roughly the same equilibrium position relative to the platform. In one implementation, the system 10 is used in a truck cabin where a driver's seat constitutes the plant and the floor of the cabin constitutes the platform.

The electromagnetic actuator 12 receives electrical power from a power supply 30 via the controller. The controller 20 uses information from the plant accelerometer 22, platform accelerometer 24 and position sensor to generate control signal 40 that is used to modulate the output current of an amplifier 25, which is supplied to the actuator.

The electromagnetic actuator is capable of responding very quickly to sudden, short changes in the vertical position of the platform. For example, if system 10 is used to suspend a truck seat, the actuator responds quickly as the truck travels over a sharp bump to keep the seat in about its equilibrium position above the floor. Because of this fast response, however, the actuator will draw high levels of power over short durations of time. Since the power supply 30 of the system (e.g., a truck's alternator or battery) may not be capable of providing adequate power, the system 10 is provided with an energy storage reservoir 32, such as a bank of capacitors, to provide for such power.

The force bias eliminator 14 is a pneumatic actuator that is connected to one or more fluid bleed valves 21 that supply compressed air to the force bias eliminator and one or more fluid release valves 23 that release air from the force bias eliminator. The controller 20 controls the fluid bleed valves 21 and fluid release valves 23 to increase and decrease the upward force exerted by the force bias eliminator. Because the force bias eliminator is a pneumatic device, it does not have as fast a response as the electromagnetic actuator. Thus, as described in U.S. patent application Ser. No. 10/978,105 titled "Active Suspending" and filed Oct. 29, 2004, the contents of which are incorporated herein by reference, the force bias eliminator is used to counteract constant load of the plant (e.g., the weight of a driver sitting on a truck seat and the seat itself) and low frequency disturbances of the platform (such those caused when a truck travels over a long, undulating bump), while the electromagnetic actuator responds to higher frequency disturbances (such as the truck traveling over a sharp bump).

Because of the different response times of the actuator (which is relatively fast) and the force bias eliminator (which is relatively slow), the actuator will immediately operate to counteract a loading or unloading event until the force bias eliminator can respond. For example, in a truck seat implementation, the actuator will immediately respond with an upward force to offset the weight of a driver when the driver sits down in the seat. The actuator will continue to exert this upward force until the force bias eliminator can respond and take over. Similarly, when a driver gets up from the seat (which is an unloading event), the actuator will exert a downward force to resist the upward force being applied by the force bias eliminator. The actuator will continue to exert the downward force until the force bias eliminator can respond to relieve the actuator. However, the actuator draws considerable current as it exerts this upward or downward force to counteract the effects of a loading or unloading event, causing it to quickly drain its energy storage reservoir (e.g., energy storage reservoir 32 shown in FIG. 1). If the actuator's energy storage reservoir empties prior to when the force bias eliminator is able to respond/take over, the actuator will lose power and the seat will suddenly drop (in a loading event) or raise (in an unloading event). This creates a potentially hazardous (or at least unpleasant) event.

To alleviate this problem, the system 10 is provided with a load-unload detector 28, which indicates to the controller 20 that a loading or unloading event has occurred. The load-unload detector may be implemented as a physical detector, such as a load detector, a weight sensor or a pressure sensor or it may be implemented as a virtual detector in software. Upon detection of a loading or unloading event, the controller 20 will immediately cause the force bias eliminator 14 to quickly respond. Additionally, in some implementations including the implementation shown in FIG. 1, the controller 20 may be configured to also slow the response of the actuator (as compared to the actuator normal response time) during a loading or unloading event. Thus, the load-unload detector 28 serves as a "trip-wire" for the system, that will cause the controller to immediately respond, without waiting for other sensor signals (e.g., signals from accelerometers 22 or 24 or position sensor 26) and/or feedback control signals (not shown) that the controller 20 may receive from the actuator and/or force bias eliminator.

If a loading event of plant 16 is detected by the load-unload detector 28, the controller 20 will immediately fully open all fluid bleed valves to cause a fluid (e.g., compressed air) to quickly fill the force bias eliminator until it reaches a point where it is exerting an upward force that counteracts the downward force exerted by the added load. Additionally, the controller 20 monitors the energy level E stored in the energy storage reservoir and progressively reduces the rate of discharge (e.g., by progressively reducing amount of current supplied to the actuator) as the energy storage reservoir 32 is progressively depleted. Similarly, if an unloading event is detected by the load-unload detector 28, the controller will fully open all fluid release valves to release the fluid from the force bias eliminator and thus eliminate the upward force it had supplied while the load was present. The controller 20 will also progressively reduce the rate of discharge as the energy storage reservoir 32 is progressively depleted.

In some implementations, the controller may not directly measure the energy stored in the energy source. Rather, the controller may use a model of the characteristics of the power supply and/or energy storage reservoir to predict the level and discharge rate of available electrical energy. It should be noted that in some implementations the force bias eliminator may have a sufficiently fast response time that there is no need for the controller to slow the response time of the actuator to conserve energy.

The fluid bleed and release valves are preferably designed such that they permit for a fast response upon detection of a loading or unloading event, but are able to be controlled to accurately respond to low frequency disturbances encountered during operation. For example, in some implementations, several bleed and/or release valves are connected in parallel that permit rapid response during a loading or unloading event (e.g., by fully opening all valves at once) but permit precise injections or releases of fluid. Alternatively, a single bleed and/or release valve is employed that can respond quickly to pass a large volume of fluid but that can also be precisely controlled.

Figure 2:
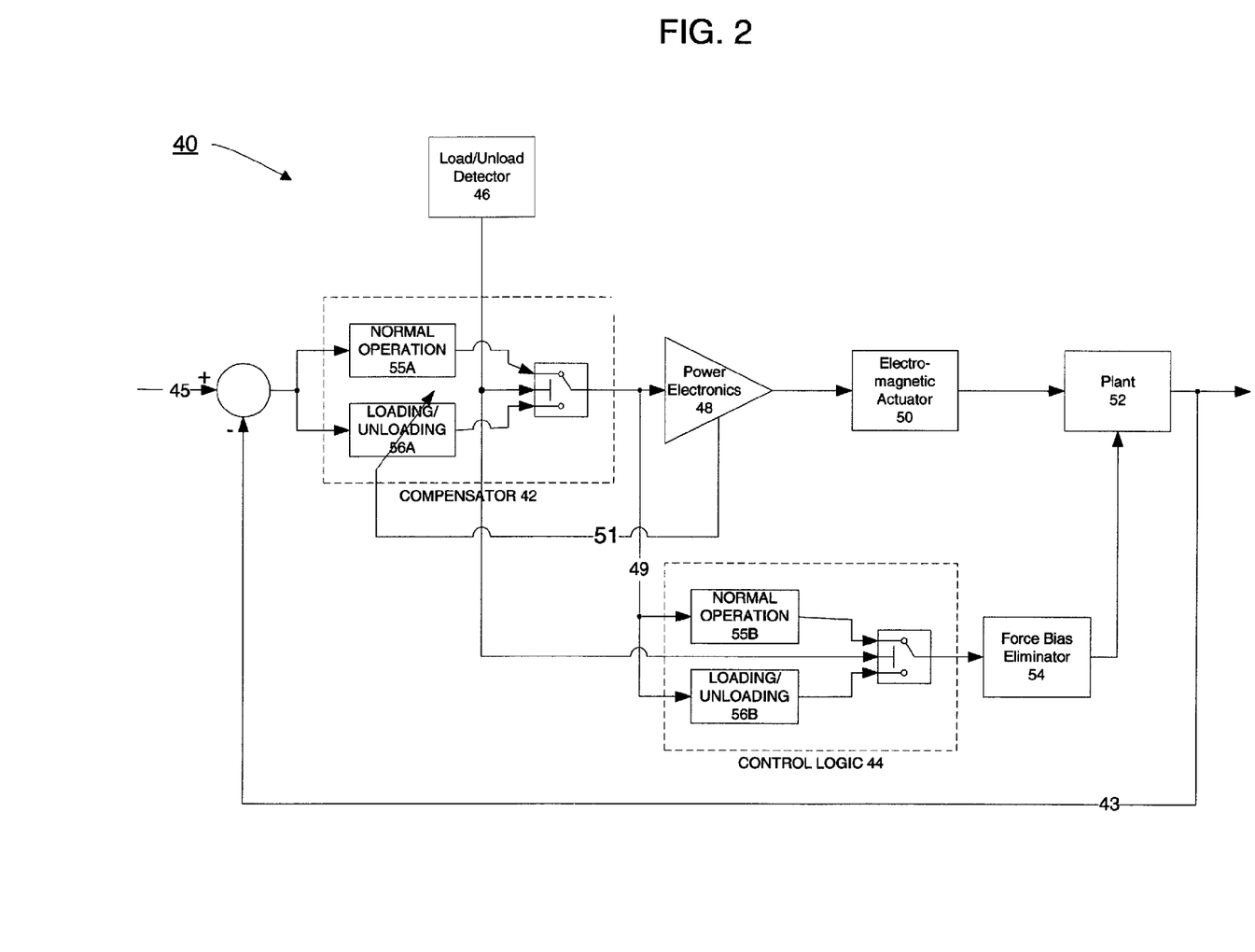
FIG. 2 is a block diagram of a control system for an active suspension system.

As shown in FIG. 2, a control system 40 for controlling an electromagnetic actuator 50 and force bias eliminator 54 is illustrated. The control system 40 includes a compensator 42 that controls operation of the actuator 50, and a control logic 44 that controls operation of the force bias eliminator 54. The compensator 42 and control logic 44 each have two modes of operation: a normal operation mode 55A, 55B and a loading/unloading operation mode 56A, 56B. A load/unload detector 46 switches the compensator 42 and control logic 44 between the two modes of operation. As indicated earlier, the load/unload detector 46 may be implemented as a physical sensor or a virtual detector (e.g., a virtual load/unload detector illustrated in FIGS. 4 and 5).

In normal operation, the compensator 42 and control logic 44 cooperatively suspend the plant 16 such that a first predetermined system performance criteria can be met. In one implementation, the compensator 42 and control logic 44 cooperatively suspend the plant 16 to maintain a predetermined equilibrium position while minimizing the acceleration experienced by the plant 16. The predetermined equilibrium position may correspond to the midpoint of stroke of the actuator 50. Control of an actuator and force bias eliminator in normal operation is described in more detail in U.S. patent application Ser. No. 10/978,105 titled "Active Suspending" and filed Oct. 29, 2004.

When the load/unload detector detects a loading or unloading event, it causes the compensator 42 and control logic 44 to immediately switch to the loading/unloading mode 56A, 56B. In this mode, the compensator receives a signal (51) indicating the electrical energy available in the energy store, and the level of current supplied to the actuator is decreased over time so as to preserve the energy in the energy store and extend the time the actuator can provide force. At the same time, the control logic 42 causes the force bias eliminator 54 to quickly respond to the loading/unloading event to relieve the actuator. Once the force bias eliminator responds to counteract the loading/unloading event (e.g., when the plant returns back to near its equilibrium position and has a velocity that is below a particular threshold), the system is switched back to its normal mode of operation.

In one implementation, when system operates in loading/unloading mode, compensator 42 and/or control logic 44 suspend the plant 16 such that a second predetermined system performance criteria can be met. In one example, a PID controller is implemented in loading/unloading mode.

Figure 3A:
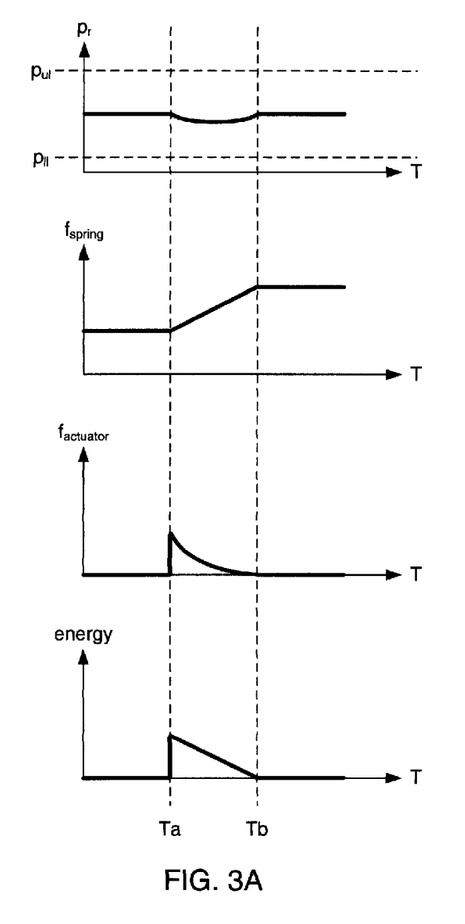
FIGS. 3A and 3B depict changes in position, forces that are exerted, and energy consumed over time as a result of unloading and loading a plant.
Figure 3B:
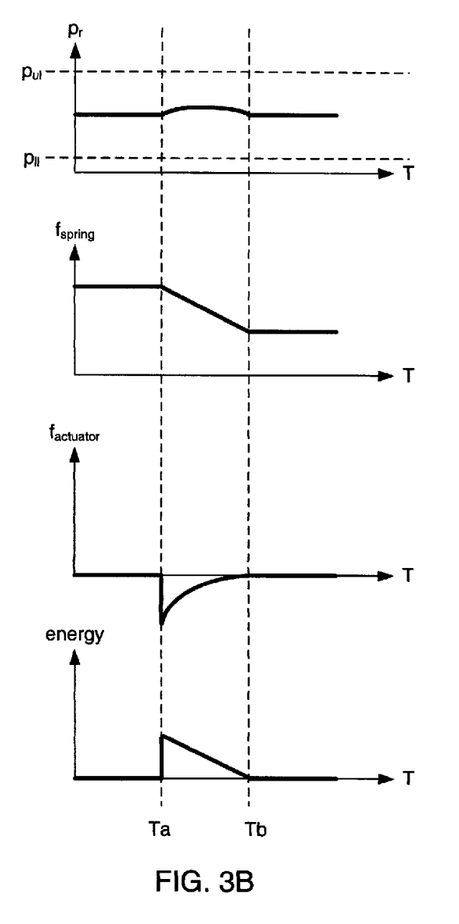

The performance of a system such as those shown in FIGS. 1 and 2 during a loading and unloading event is shown in FIGS. 3A and 3B, respectively. As shown in the top graph of FIG. 3A, the plant 16 undergoes a slight change in position (in the downward direction) when a loading event happens at time Ta, but does not come close to the lower limit of the plant's vertical travel ($p_{ll}$). As shown in the middle graph, the controller opens fluid bleed valves at time Ta to rapidly raise the upward spring force of the force bias eliminator such that it has fully responded to the loading event at time Tb. In this example, the response of the force bias eliminator is linear. As the force bias eliminator transitions counteract the downward force of the loading event at time Tb, the position of the seat is slightly raised to its equilibrium position between its upper and lower limits of vertical travel ($P_{ul}$ and $p_{ll}$ respectively). And as shown in the third graph, the controller controls the actuator to quickly respond at time Ta with an upward force, but then rapidly decreases the upward force exerted by the actuator over the response time of the force bias eliminator such that the actuator is back to a "rest" state at time Tb. The controller decreases the upward force exerted by the actuator as a function of the energy available in the energy storage reservoir (e.g., element 32 in FIG. 1). In this example, the controller monitors the level of available energy and controls the actuator such that the energy is linearly dissipated by the actuator at a rate that the energy storage reservoir will be depleted at approximately the same time as when the force bias eliminator responds (this is illustrated in the bottom graph of FIG. 3A). Thus, as the power source is depleted, the actuator force ramps down gently while the seat position is relaxed towards equilibrium. The force in the actuator during the loading and unloading event is no longer the difference between the spring force and the mass, but something smaller, dependent on the energy in the cap (voltage).

Figure 4:
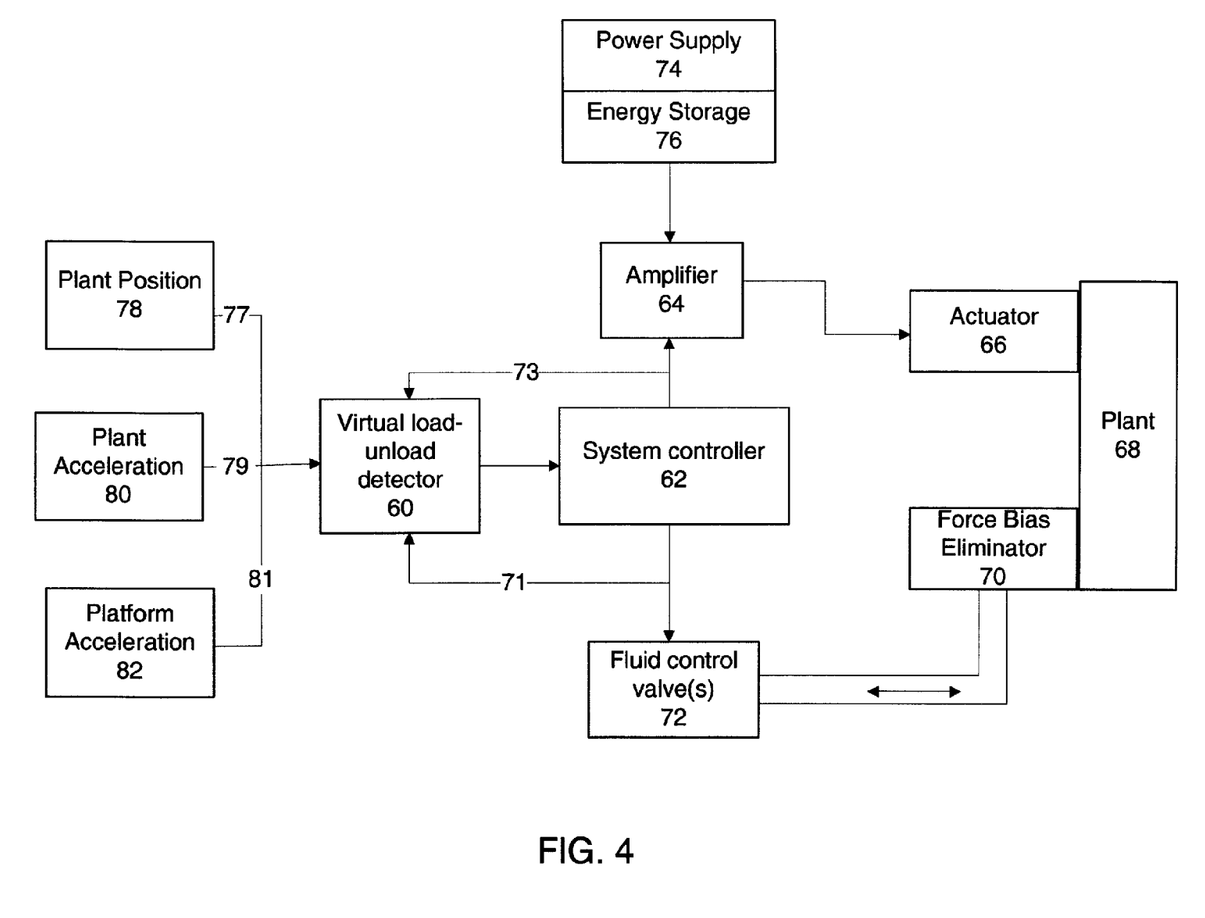
FIG. 4 is a block diagram of a control system for an active suspension system.

Similarly, as shown in upper graph of FIG. 3B, the plant undergoes a slight change in position (in the upward direction) when an unloading event happens at time TA. As before, this change in position does not come close to the upper limit of the plant's vertical travel ($p_{ul}$). As shown in the middle graph, the controller opens fluid release valves at time Ta to quickly reduce the upward spring force of the force bias eliminator such that it has fully responded to the unloading event at time Tb. As the force bias eliminator transitions to counteract the upward force caused by the unloading event at time Tb, the position of the seat is slightly lowered to its equilibrium position between its upper and lower limits of vertical travel ($p_{ul}$ and $p_{ll}$ respectively). And as shown in the bottom graph, the controller controls the actuator to quickly respond at time Ta with a downward force, but then rapidly decreases the downward force exerted by the actuator over the response time of the force bias eliminator such that the actuator is back to a "rest" state at time Th. As before, the controller gradually decreases the downward force exerted by the actuator as a function of the amount of available energy. As mentioned above, the load-unload detector may be implemented as a physical detector such as a pressure switch on the surface of the plant or as a "virtual" detector in software. FIG. 4 illustrates an example of a virtual load-unload detector.

As shown in FIG. 4, a virtual load-unload detector 60 receives the signals used to control the actuator (signal 73) and force bias eliminator (signal 71), one or both of the signals indicating the current position (signal 77) and acceleration of the plant (signal 79), and, in some implementations, the acceleration of the platform (signal 81). In one implementation, the virtual load-unload detector monitors the control signals 71, 73 and one or both of the current position 77 and acceleration signal 79 of the plant 68 to determine if the current vertical position and/or any current vertical movement of the plant is inconsistent with a vertical position and/or vertical movement that was expected, by a plant model, in response to the current state of the control signals 71, 73. In other words, the virtual load-unload detector 60 watches for instances where the plant 68 is either at a vertical position or is moving vertically in a manner that is not what was expected to occur as a result of the manner in which the actuator 66 and the force bias eliminator 70 are being operated. A vertical position or vertical movement of the plant 68 that is inconsistent with what was expected in view of the current operation of the actuator 66 and the force bias eliminator 70 tends to indicate that an external force is acting on the plant 68 in addition to whatever forces that the actuator 66 and/or the force bias eliminator 70 are exerting on the plant 66 through the control signals 71, 73.

This inconsistency may or may not be caused by loading or unloading event, and the virtual load-unload detector 60 attempts to distinguish between external forces causing such an inconsistency that arise from loading or unloading events from external forces that arise for other reasons. For example, in some embodiments, the virtual load-unload detector 60 determines whether the external force have direction opposite or in the same direction of seat movement. Where there appears to be such a resistive external force (e.g., with direction opposite to the seat movement, and with a magnitude greater than a predetermined threshold), an assumption may be made by the virtual load-unload detector 60 that a frictional force indicative of a mechanical malfunction has occurred, and not a loading or unloading event. Where there appears to be an external force (of a magnitude greater than a predetermined threshold) that are in the same direction of the seat movement, the virtual load-unload detector 60 may presume that a loading or unloading event has occurred.

When the virtual load-unload detector 60 determines that there has been a load-unload event, the controller will immediately respond to cause the force bias eliminator to counteract the load-unload event, and, in some implementations, actively manage the power drawn by the actuator so as not to rapidly deplete its energy source allowing the actuator to provide force for a longer time period.

Under normal working condition, the force disturbance (for example, friction) acting on the actuator varies within a small range. However, at event of loading/unloading, the change of load will manifest as a large force disturbance whose direction relates to the moving direction of the system. This feature enables us to use force disturbance with the position signal as an event signature to detect the occurrence of loading/unloading very quickly.

Figure 5:
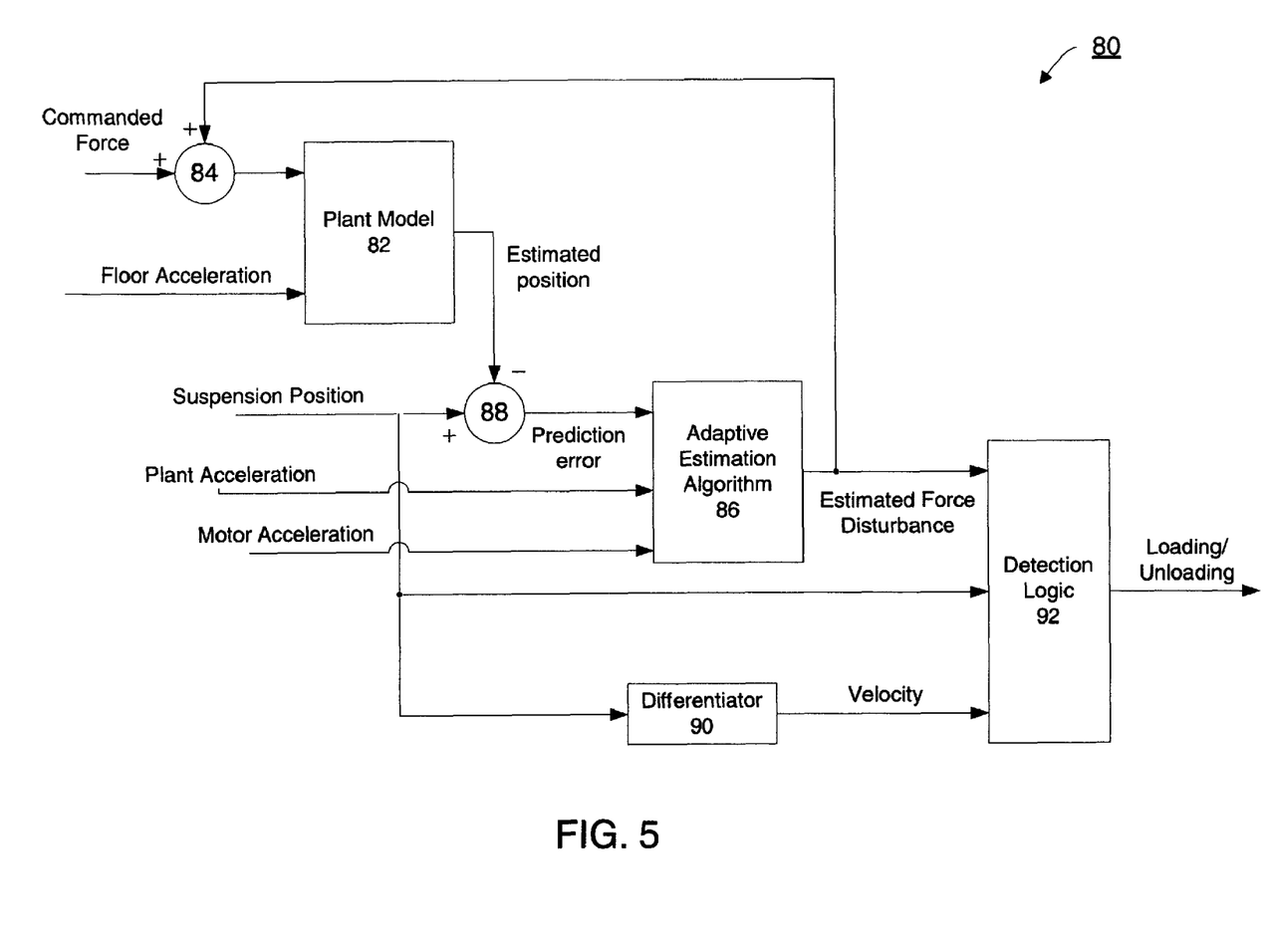
FIG. 5 is a block diagram of a virtual load-unload detector.

As shown in FIG. 5, another example of a virtual load/unload detector 80 includes a plant model 82 and an adaptive estimation algorithm 86. The plant model 82 takes the commanded force and floor acceleration as inputs to calculate a predicted suspension position. In the context of present application, the suspension position is defined as relative position between the plant and the floor. This predicted suspension position is then compared with the measured suspension position to generate a prediction error. The prediction error is fed into the adaptive estimation algorithm 86, along with plant and motor acceleration, to estimate the force command disturbance that has caused the prediction error. The estimate force command disturbance together with the measured suspension position and velocity is passed to detection logic 92 where the signs and boundaries of the signals are checked against a set of disturbance isolation criteria. In one implementation, the detection logic 92 detects whether the estimated force command has a magnitude greater than a predetermined threshold that is in the same direction as the measured plant velocity, the detection logic 92 will indicate a loading or unloading event has occurred.

A number of embodiments of the invention have been described. Nevertheless, it will be understood that various modifications may be made without departing from the spirit and scope of the invention. For example, while the foregoing examples primarily use an electromagnetic actuator in parallel with a variable air spring, the system may be implemented with any two types of actuators that have different response times—a "fast" actuator to quickly respond to higher frequency events and a "slow" actuator (or force bias eliminator) that responds to DC or low frequency events. Similarly, while the figures illustrate certain elements as singular blocks (e.g., a controller), actual systems may implement these elements in separate components. For example, the system controller shown in FIG. 1 may be implemented as two controllers using separate processors (e.g., one that controls the actuator and a second that controls the force bias eliminator). Finally, the examples given above have largely centered on a plant that is a truck seat. However, other forms a plant are within the scope of this disclosure, such a seat of a passenger car, a floor of a cargo truck, a weapons platform of a military vehicle, or an entire room within a sea vessel. Accordingly, other embodiments are within the scope of the following claims.

What is claimed is:

1. An active suspension system comprising:
    a force bias eliminator;
    an actuator configured to be operably coupled to an energy storage reservoir;
    a plant connected to and suspended from a vehicle by the force bias eliminator and the actuator, such that the actuator and force bias eliminator jointly suspend the plant along a substantially vertical axis;
    a load-unload detector that detects a loading or unloading of the plant; and
    a control system operably coupled to the load-unload detector, the force bias eliminator, the energy storage reservoir and the actuator, wherein the control system, in response to a loading or unloading of the plant detected by the load-unload detector:
        determines the amount of energy stored in the energy storage reservoir;
        causes the force bias eliminator to respond to counteract forces acting on the plant as a result of the loading or unloading; and
        responsive to the determined amount of energy, reduces the current supplied to the actuator to reduce the rate of energy discharge from the energy storage reservoir while the force bias eliminator responds to counteract the forces.

2. The system of claim 1 wherein the actuator is an electromagnetic actuator.

3. The system of claim 1 wherein the control system reduces a rate of discharge of energy to prevent the energy available in the energy source from being fully discharged before the force bias eliminator responds to counteract the forces acting on the plant as a result of the loading or unloading.

4. The system of claim 1, wherein the force bias eliminator comprises a variable capacity fluid cylinder.

5. The system of claim 4 further comprising fluid control valves for supplying a fluid to or removing a fluid from the variable fluid cylinder.

6. The system of claim 5 wherein the control system is configured to control the response of the force bias eliminator by controlling the fluid control valves.

7. The system of claim 1 wherein the force bias eliminator comprises a variable capacity air cylinder.

8. The system of claim 1 wherein the load-unload detector comprises a physical detector.

9. The system of claim 8 wherein the load-unload detector comprises a pressure switch located on a surface of the plant.

10. The system of claim 1 wherein the load-unload detector comprises a virtual detector.

11. The system of claim 1 wherein the plant comprises a vehicle seat.

12. The system of claim 1 wherein the plant comprises a cabin of a vehicle.

13. A method for controlling an active suspension system that includes a plant connected to and suspended relative to a vehicle by a force bias eliminator and actuator, the method comprising:
    receiving a signal from an load-unload detector indicating that a loading or unloading of a plant has occurred;
    in response to a loading or unloading of the plant detected by the load-unload detector, causing the force bias eliminator to reduce the current supplied to the actuator to reduce the rate of energy discharge from an energy storage reservoir while the force bias eliminator responds to counteract forces acting on the plant as a result of the loading or unloading.

14. The method of claim 13 wherein the actuator comprises an electromagnetic actuator.

15. The method of claim 13 wherein controlling the actuator to preserve energy comprises:
    reducing a rate of discharge of energy to prevent the energy available in the energy source from being fully discharged before the force bias eliminator responds to counteract the forces acting on the plant as a result of the loading or unloading.

16. The method of claim 13 further comprising:
    estimating a position of the plant;
    comparing the estimated position of the plant with an actual position of the plant to determine a prediction error; and
    determining whether loading or unloading of the plant has occurred based on at least the magnitude of the prediction error.

17. A vehicle seat system comprising:
    a force bias eliminator;
    an electromagnetic actuator configured to be operably coupled to an energy storage reservoir;
    a seat connected to and suspended relative to a vehicle by the force bias eliminator and the actuator, such that the actuator and force bias eliminator jointly provide for movement of the plant relative to the vehicle along a substantially vertical axis;
    a load-unload detector that detects a loading or unloading of the seat; and a control system operably coupled to the load-unload detector, the force bias eliminator and the actuator, wherein the control system, in response to a loading or unloading of the seat detected by the load-unload detector:
  causes the force bias eliminator to respond to counteract forces acting on the seat as a result of the loading or unloading; and
  reduces the current supplied to the actuator to reduce the rate of energy discharge from an energy storage reservoir while the force bias eliminator responds to counteract the forces.

18. The system of claim 17, wherein the force bias eliminator comprises a variable capacity fluid cylinder.

19. The apparatus of claim 17 wherein the force bias eliminator comprises a variable capacity air cylinder.

20. The system of claim 17 wherein the load-unload detector comprises a physical detector.

21. The system of claim 17 wherein the load-unload detector comprises a virtual detector.

* * * * *